(12) United States Patent
Jensen et al.

(10) Patent No.: US 8,618,933 B2
(45) Date of Patent: Dec. 31, 2013

(54) MONITORING METHOD AND APPARATUS USING ASYNCHRONOUS, ONE-WAY TRANSMISSION FROM SENSOR TO BASE STATION

(75) Inventors: Scott L. Jensen, Carrier, MS (US); George J. Drouant, Mandeville, LA (US)

(73) Assignee: The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 1675 days.

(21) Appl. No.: 11/866,042

(22) Filed: Oct. 2, 2007

(65) Prior Publication Data

US 2008/0252475 A1 Oct. 16, 2008

Related U.S. Application Data

(60) Provisional application No. 60/828,074, filed on Oct. 4, 2006.

(51) Int. Cl.
*G08B 1/08* (2006.01)

(52) U.S. Cl.
USPC ........ 340/539.3; 340/442; 340/447; 340/683; 73/146

(58) Field of Classification Search
USPC .......... 340/683, 669, 539.1, 442, 447, 539.3; 73/146; 116/34 R, 34 A
See application file for complete search history.

(56) References Cited

U.S. PATENT DOCUMENTS

| | | | |
|---|---|---|---|
| 7,127,576 B1 * | 10/2006 | Riggs | 711/162 |
| 7,212,104 B2 * | 5/2007 | Haswell et al. | 340/442 |
| 2002/0190856 A1 * | 12/2002 | Howard | 340/531 |
| 2003/0080869 A1 * | 5/2003 | Pellet et al. | 340/573.1 |
| 2004/0150384 A1 * | 8/2004 | Holle et al. | 324/110 |
| 2005/0203683 A1 * | 9/2005 | Olsen et al. | 701/35 |
| 2006/0220834 A1 * | 10/2006 | Maeng | 340/539.1 |
| 2007/0013512 A1 * | 1/2007 | Burneske et al. | 340/539.13 |
| 2007/0182577 A1 * | 8/2007 | Muralidharan et al. | 340/669 |
| 2008/0059019 A1 * | 3/2008 | Delia et al. | 701/35 |

* cited by examiner

*Primary Examiner* — Kerri McNally
(74) *Attorney, Agent, or Firm* — Michelle L. Ford (57) ABSTRACT

A monitoring system is disclosed, which includes a base station and at least one sensor unit that is separate from the base station. The at least one sensor unit resides in a dormant state until it is awakened by the triggering of a vibration-sensitive switch. Once awakened, the sensor may take a measurement, and then transmit to the base station the measurement. Once data is transmitted from the sensor to the base station, the sensor may return to its dormant state. There may be various sensors for each base station and the various sensors may optionally measure different quantities, such as current, voltage, single-axis and/or three-axis magnetic fields.

20 Claims, 5 Drawing Sheets

Fig. 7

MONITORING METHOD AND APPARATUS USING ASYNCHRONOUS, ONE-WAY TRANSMISSION FROM SENSOR TO BASE STATION

CROSS-REFERENCE TO RELATED APPLICATIONS

The present application claims priority under 35 U.S.C §119(e) to U.S. Provisional Patent Application Ser. No. 60/828,074 filed on Oct. 4, 2006, which are commonly assigned and herein incorporated by reference.

ORIGIN OF THE INVENTION

The invention described herein was made in the performance of work under a NASA contract and by an employee of the United States Government and is subject to the provisions of Section 305 of the National Aeronautics and Space Act of 1958, as amended, Public Law 85-568 (72 Stat. 435, 42 U.S.C. §2457), and may be manufactured and used by or for the Government for governmental purposes without the payment of any royalties thereon or therefore.

BACKGROUND OF THE INVENTION

1. Field of the Invention

The present invention is directed to a monitoring method and apparatus that uses asynchronous, one-way transmission from a sensor to a base station.

2. Description of the Related Art

Rocket engines and related hardware undergo extensive propulsion testing before being accepted in service. Previous propulsion testing has incurred unexpected schedule delays and cost overruns due to untimely maintenance, repair, or replacement of facility valves. The serviceable conditions of test critical valves utilized in the Propulsion Test Facility at the Stennis Space Center are considered critical to acceptable performance. The significant pieces of test equipment utilized in propulsion testing must be closely monitored and maintained in safe working order.

It is considered cost prohibitive to maintain spares for existing valves having replacement periods of over 1 year and repair times of over 6 months. It is becoming increasingly necessary to track the life of linearly-actuated valves and high-geared ball valves to efficiently perform testing. Having an acceptable valve monitoring system would aid in managing valve maintenance and failures.

Currently, obtainable operational data available for the test critical valves at Stennis Space Center make any prognosis of the life expectancy of the valves unpredictable at best. Predictions of life expectancy and failure conditions should be greatly improved through added valve instrumentation. However, conventional instrumentation has been cost prohibitive and incapable of being mounted in the desired locations necessary to monitor all operational aspects of the test critical valves.

As will be described in greater detail hereinafter, the present invention solves the problems confronting known valve test assemblies by monitoring the valves and creating a knowledge database including valve operational characteristics that more accurately predict valve life duration and premature valve failure.

SUMMARY OF THE INVENTION

An embodiment is a monitoring system, comprising: a base station; a first sensor separated from the base station and in wireless, one-way communication with the base station; and a first vibration-sensitive switch for triggering the first sensor. The first sensor remains dormant unless triggered by the first vibration-sensitive switch. Upon being triggered by the first vibration-sensitive switch, the first sensor transmits a first measured quantity and a first time stamp to the base station.

A further embodiment is a monitoring system, comprising: a base station; a sensor separated from the base station and in wireless, one-way communication with the base station; and a piezoelectric laminate vibration-sensitive switch for triggering the sensor. The sensor remains dormant unless triggered by the vibration-sensitive switch. Upon being triggered by the vibration-sensitive switch, the sensor transmits a measured quantity and a time stamp to the base station. The sensor measures at least one of a current signal, a voltage signal, a discrete digital signal, a single-axis magnetic field, and a three-axis magnetic field.

A further embodiment is a method of monitoring a valve, comprising: measuring a number of cryogenic cycles of the valve; measuring a number of total cycles of the valve; measuring an inlet temperature of the valve; measuring an outlet temperature of the valve; measuring a body temperature of the valve; measuring a torsional strain of the valve; measuring a linear strain of the valve; measuring a preload position of the valve; measuring a total travel of the valve; measuring a total direction change of the valve; and predicting a valve life in response to at least one of the number of cryogenic cycles, the number of total cycles, the inlet temperature, the outlet temperature, the body temperature, the torsional strain, the linear bonnet strain, the preload position, the total travel, and the total direction change of the valve.

DETAILED DESCRIPTION OF THE INVENTION

A monitoring system is disclosed, which includes a base station and at least one sensor unit that is separate from the base station. The sensor unit resides in a dormant state that uses no power, until it is awaked by the triggering of vibration-sensitive switch. Once awakened, the sensor may take a measurement, then transmit to the base station the measurement along with a time stamp of when the measurement was made. The sensor may optionally store the measured quantity and the time stamp for a particular length of time in a suitable storage device, such as with compact flash memory. The sensor transmits the measured quantity and the time stamp to the base station in an asynchronous manner. The transmission is initiated by the vibration-sensitive switch, not by the base station. The time stamp is encoded in a suitable manner, such as with an IRIG-B timing module. Once data is transmitted from the sensor to the base station, the sensor may return to its dormant state. Transmission between the sensor and the base station is one-way, so that the sensor does not receive any information from the base station. There may be multiple sensors for each base station, and the various sensors may optionally measure different quantities, such as current, voltage, single-axis, and/or three-axis magnetic fields, that may correspond to physical quantities such as torsional strain, linear strain, temperature, ball valve cycles, and linear voltage displacement transducer signals. The sensor may optionally include an energy harvester, such as a solar panel, for reducing and/or eliminating the drain on its battery.

Some embodiments of the present invention are directed to a valve monitoring system that can function either as a stand-alone unit or can be readily integrated into a higher-level health management system. In some embodiments, the monitoring system can be utilized for tracking and archiving data that can be used in aiding failure predictions of high-geared ball valves and linearly actuated valves of the type utilized in propulsion testing at the Stennis Space Center.

Alternatively, the monitoring system may be used to monitor any suitable quantity, such as the temperature in a particular location in a building or the strain on a particular location on a bridge. Although the language in the remainder of this document is directed primarily toward measuring properties of valves, it will be understood by one of ordinary skill in the art that any suitable quantity may be measured, on any suitable structure, without any particular limits to valves.

The types of data that can be tracked and collected by the valve monitoring system of the present invention may include: cryogenic cycles, total cycles, inlet temperature, outlet temperature, body temperature, torsional strain, linear bonnet strain, preload position, total travel, and total directional changes. The valve monitoring system is capable of real-time monitoring of the various valve assemblies whereby the collected data is recorded and time stamped in accordance with the IRIG B True Time. The monitoring system may be designed for use in a Class 1 Division II explosive environment.

The fundamental configuration of the valve monitoring system comprises a single base station and multiple sensor units. Each sensor unit is adapted to perform a particular monitoring function on a valve assembly. For example, different sensor units may be employed to measure torsional strain, linear strain, temperature, valve cycles, and valve position. These operational characteristics of the valve assemblies provide data that can be utilized to project valve failures as well as degraded performance. Each sensor unit is functionally encapsulated to protect its functional integrity while assuring continued performance in all types of environments. Each sensor unit is conveniently organized to include a sensor controller, power regulator, at least one and preferably two battery packs, transmitter module, wake-up module, and several instrumentation modules The data generated by each sensor unit in monitoring performance aspects of the valve assembly may be transmitted to a single base station.

The base station may conveniently be organized to include a main base station controller, flash memory interface, external communication module, bus interface, and several receiver modules. Each receiver module has a unique address and is matched to a particular remote sensor unit's transmitter.

It is known that the number of valve cycles is directly correlated to valve degradation and eventual failure. A sensor unit constructed in accordance with the present invention may conveniently be positioned to track the total number of valve cycles that occur during operation of the valve assembly. Likewise, the number of valve cycles occurring under cryogenic conditions may be tracked. The service duration for valves at cryogenic operation temperatures will differ significantly from the service duration at ambient temperatures. The determination of cryogenic or ambient valve life may be predicted by correlating the inlet and outlet temperatures with each valve cycle.

The monitoring system of the present invention may further include at least one torsional strain sensor unit. This torsional sensor unit must be compact enough to fit with a clearance of 2 by 3 by 2 inches adjacent to the ball valve shaft. The motion of the valve shaft necessitates the use of a wireless interface between the sensor unit and the base unit. The particular monitoring system created at the Stennis Space Center was further designed for use in a Class 1 Division II hydrogen environment per National Electrical Code Article 501. All of the sensor units were potted in a hydrogen compatible material such as blue-epoxy flame retardant 832 FRB.

The monitoring system includes a sensor unit designed for counting the cycles the ball valve undergoes while in service. A switch sensor unit utilizes five magnetic position switches for indicating the ball valve state. A temperature sensor was constructed to monitor the inlet and outlet temperatures utilizing cold junction referenced thermocouples. A total of four separate sensor units are believed to be adequate for monitoring a single high-geared ball valve.

The monitoring system comprising the present is also adaptable for monitoring linearly-actuated valves. The valve plug seating is targeted as a significant point of failure along with the packing and seal breakdown. Failures may occur as a result of irregularities in the force during valve cycling which can be tracked by logging the strains on each side of the valve bonnet. A linear strain sensor unit is capable of monitoring the axial strain on opposite sides of the valve bonnet. By observing irregularities in the force applied to the valve, it is possible to identify issues involving linear valve stroke, which helps denote signs of failure in the valve packing or seals. Another sensor unit is capable of tracking the total distance of valve travel and the number of directional changes occurring over its duration of service. A signal sensor unit was designed to unobtrusively interface into the Linear Voltage Displacement Transducer (LVDT) signal from the internal servo controller. The LVDT signal provides a highly accurate valve position within 0.01% of the valve stroke. The inlet and outlet temperatures are monitored with a temperature sensor unit identical to the unit utilized to monitor the temperatures on the high-geared ball valve. The temperature sensor unit can also preferably be used to monitor the valve body temperature.

The detailed discussion of a preferred embodiment of the valve monitoring system formed in accordance with the present invention is set forth in the section below entitled "Technical Description."

The basic configuration of the valve monitoring system includes multiple instrumentation sensor units transmitting to a single base station. While the preferred embodiment is directed to monitoring valve assemblies, the invention is not to be so limited. The monitoring system is readily adaptable to a variety of commercial applications requiring long-term monitoring for events associated with torsional strain, biaxial strain, linear strain, cryogenic temperatures, ambient temperatures, limit switches, 4-20 milliamp signals, 0-10 volt signals, and magnetic fields. The monitoring system accurately time stamps all collected data events and can easily be located for service with a Class 1, Division 2 environment. The Compact Flash memory module utilized in the monitoring system of the present invention may be made to the ARMA Design i.e., www.armanet.com.

In some embodiments, the Compact Flash memory module from the ARMA Design may be replaced by a USB memory module. Such a USB module may be more reliable and may allow better access to the collected data. The circuit may allow common USB memory jump drives formatted to Fat16 and Fat32 file structures to be used for data storage and retrieval.

Note that there may be additional sensor modules for monitoring a variety of vibrations, accelerations, and pressures.

An option for the sensor is an energy harvester, which can gather energy from its surroundings. For instance, a particular energy harvester may use thermal differences, i.e. cyclical changes in temperature over time, to generate and/or regenerate energy, which may reduce and/or eliminate the drain on a battery in the sensor. Alternatively, an energy harvester may gather energy from vibrations (analogous to the mechanism in self-winding wristwatches), solar energy, and/or RF signals that originate outside the sensor.

Technical Description

The Monitoring System Fundamental Configuration

Figure 1:
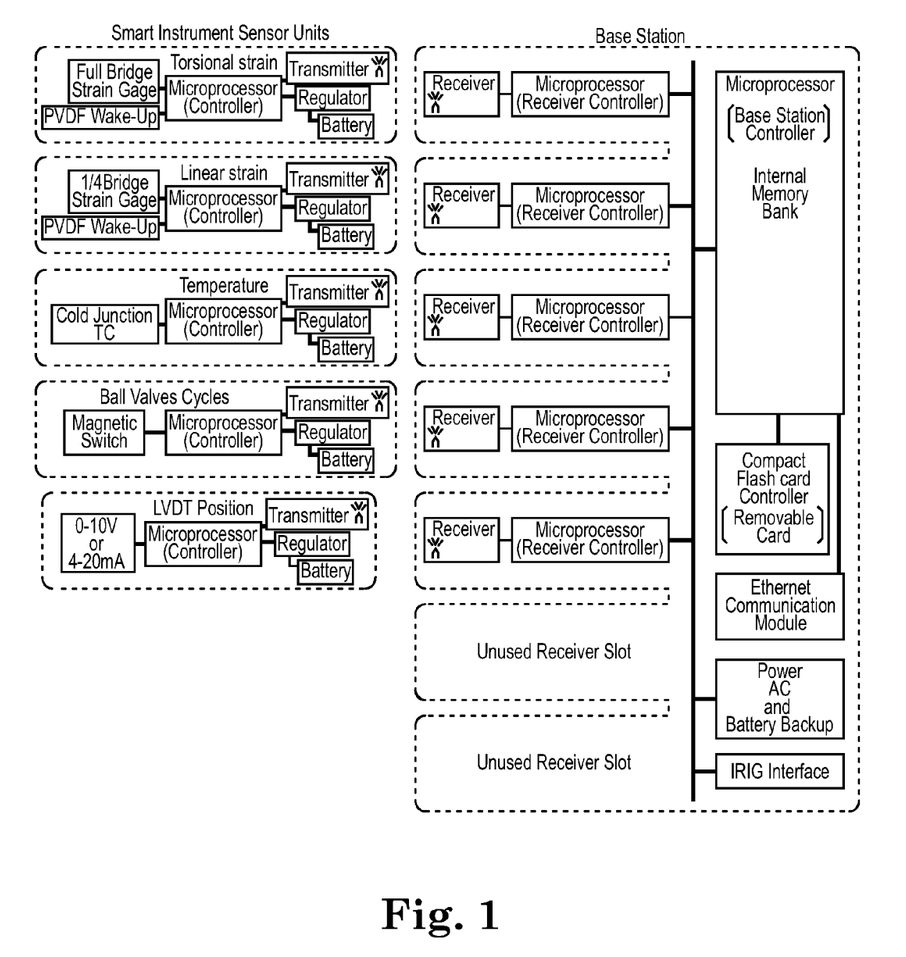
FIG. 1 is a schematic diagram of a typical sensor unit's organizational configuration.

The valve monitoring system's fundamental configuration includes a single base station and multiple sensor units. Each sensor unit is assembled for a particular monitoring function. The units are designed for torsional strain, linear strain, temperature, valve cycles and valve position monitoring. These quantities are identified to provide data on the necessary valve attributes that would indicate valve failures and degraded performance. All the sensor units are functionally encapsulated and the detected events are coordinated through the base station. The base station is organized into the main base station controller, flash memory interface, external communication module, bus interface, and several receiver modules. Each receiver unit has a unique address and is matched up with a remote sensor unit's transmitter. The sensor units are organized into a sensor controller, power regulator, two battery packs, transmitter module, wake-up module, and several instrumentation modules. The configuration is shown in FIG. 1.

The high-geared ball valves and the linearly actuated valves are targeted for health monitoring with this system. The system may be configured for other monitoring duties and not limited to these valve types. The placement and utilization of the sensors determine the quality of the systems monitoring capabilities.

Figure 2:
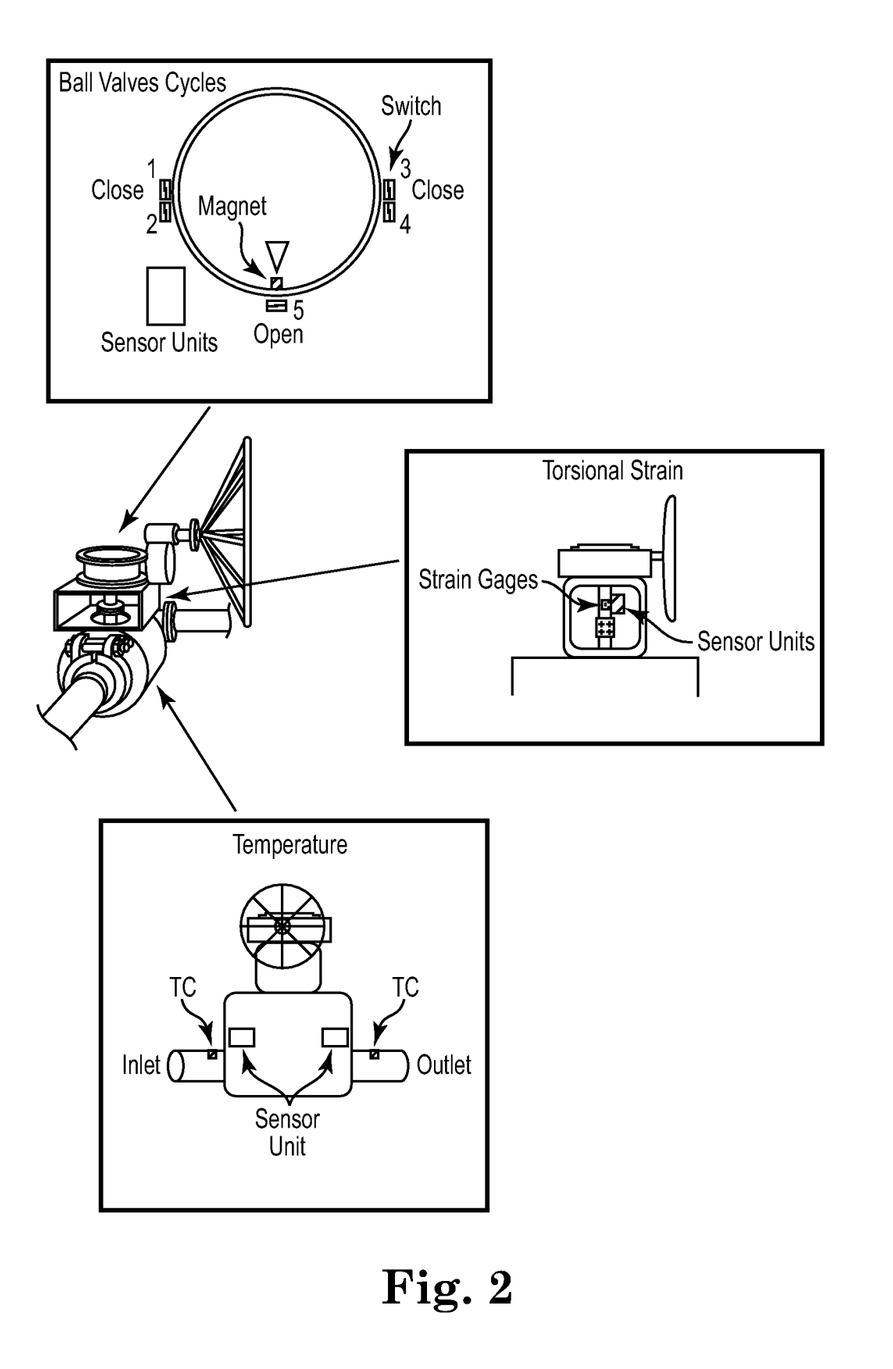
FIG. 2 is a schematic diagram of typical placement of sensor units on high-geared ball valves.

A method for determining how much a ball valve has been utilized is accomplished by tracking the total number of valve cycles. The number of valve cycles correlated with valve failures provides a basis for making valve life predictions. Another consideration in predicted valve life durations is the number of cycles under cryogenic service. The service duration for valves at cryogenic temperatures are typically different from ambient operation. The determination of cryogenic or ambient operation may be made by correlating the inlet and outlet temperatures with each valve cycle. The monitoring system is constructed with a torsional strain sensor unit. The unit was made small enough to be mounted on the ball valve shaft. The clearance necessary for this mounting location may be approximately 2 by 3 by 3 inches. The motion of the shaft making wiring the sensor unit difficult, and it may be preferable to use a wireless interface. The monitoring system is designed for use in a Class I Division II hydrogen environment per National Electrical Code Article 501. All the units may be potted in a hydrogen compatible material. The potting material used may be blue-epoxy flame retardant 832 FRB, which is commercially available from M.G. Chemicals. A sensor unit is designed for counting the cycles of the ball valve. The switch sensor unit uses five magnetic position switches for indicating the ball valve state. A sensor unit, including the temperature unit, is constructed to monitor the inlet and outlet temperatures utilizing cold junction referenced thermocouples. A total of four sensor units are adequate for monitoring a single high-geared ball valve. The typical sensor unit mounting locations on high-geared ball valves are shown in FIG. 2.

Figure 3:
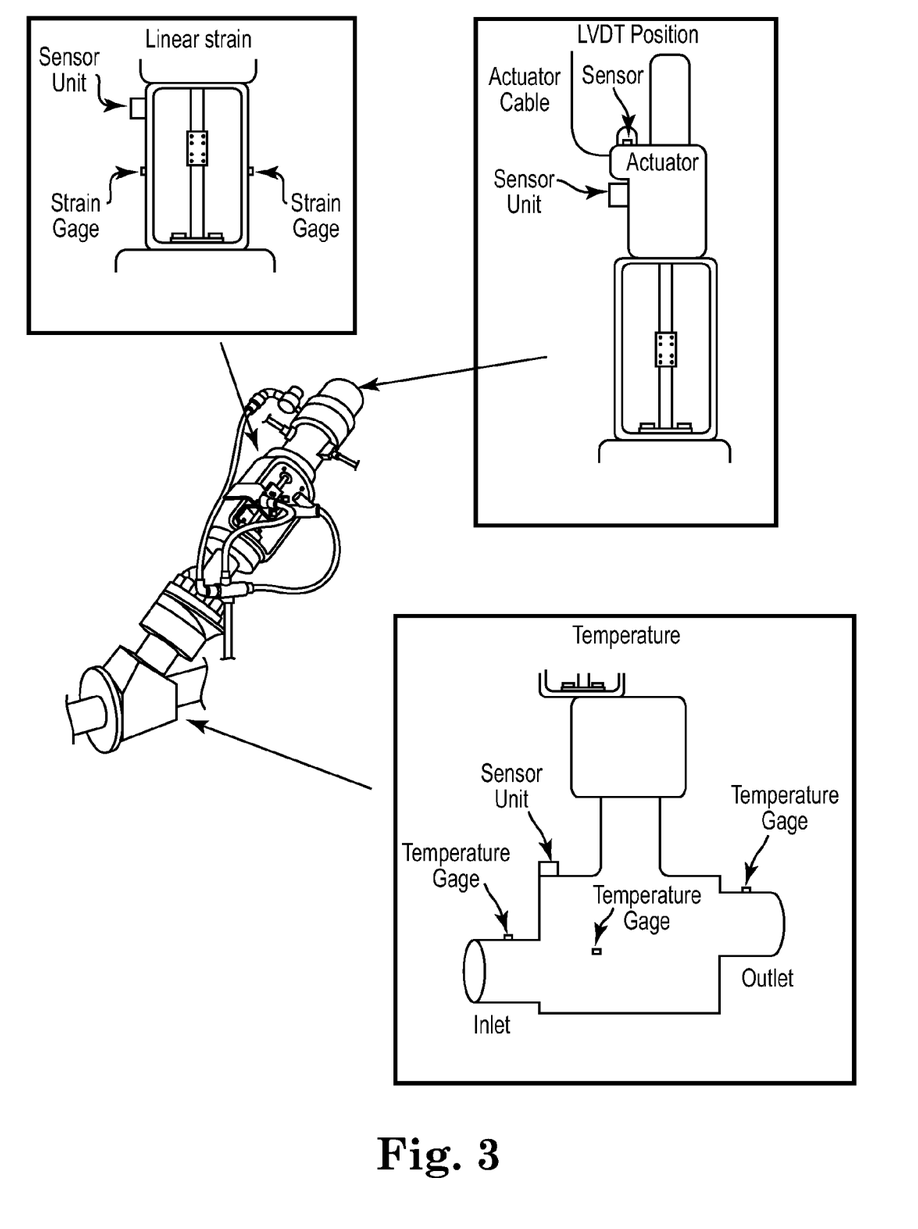
FIG. 3 is a schematic diagram of typical placement of sensor units on linearly-actuated ball valves.
Figure 4:
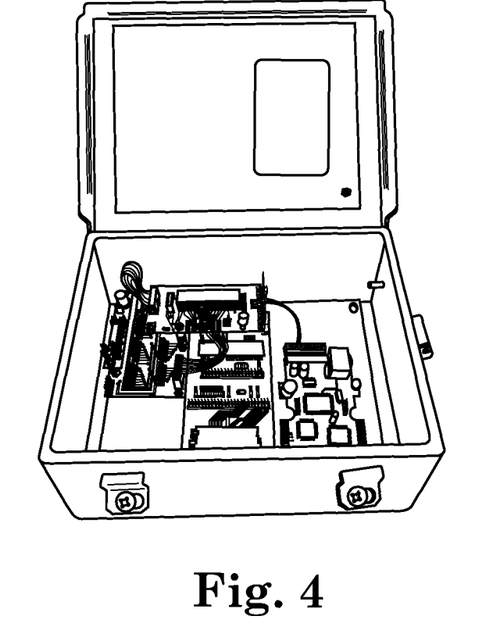
FIG. 4 is a plan drawing of the base and enclosure.
Figure 5:
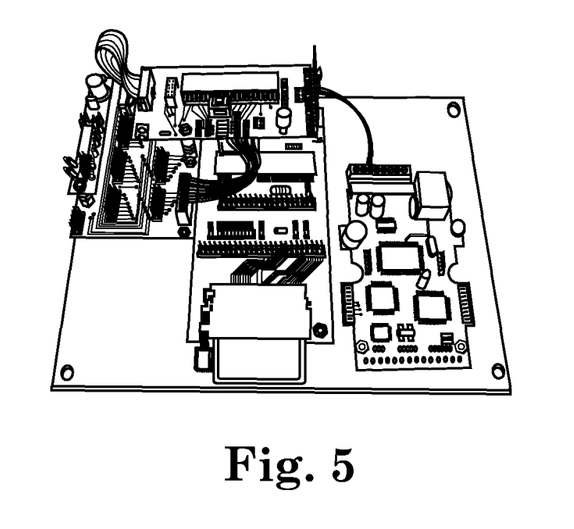
FIG. 5 is a plan drawing of the base station.
Figure 6:
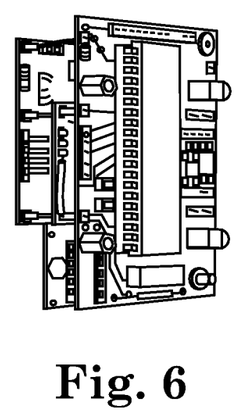
FIG. 6 is a plan drawing of the un-potted sensor unit.
Figure 7:
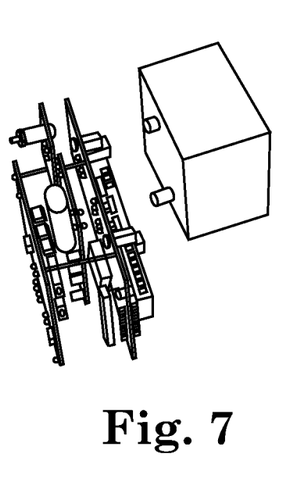
FIG. 7 is a plan drawing of the sensor unit and a potted battery pack.

The monitoring system is designed to also observe linearly-actuated valves. The valve plug seating is targeted as a significant point of failure along with packing and seal breakdown. Irregularities in the force during valve cycling may be determined by logging the strains on each side of the valve bonnet. A linear strain sensor unit is developed for monitoring the axial strain on the sides of the valve bonnet. Observing irregularities in this force may indicate issues involving the linear valve stroke, which may help denote signs of failure in the valve packing or seals. Another sensor unit is designed for tracking the total distance of valve travel and number of directional changes over its duration of service. The signal sensor unit is designed to unobtrusively interface into the Linear Voltage Displacement Transducer (LVDT) signal from the internal servo controller. The LVDT signal provides a highly accurate valve position within 0.01% of the valve stroke. The inlet and outlet temperatures are monitored with a temperature sensor unit identical to the one used to monitor temperatures on the high-geared ball valve. The temperature sensor unit may also be used to monitor the valve body temperatures. The typical sensor unit mounting locations on linearly-actuated valves are shown in FIG. 3.

The Monitoring System Base

The foundations of the units are microprocessor controller circuits which utilize the PIC16F877A microprocessor, commercially available from Microchip Technology Incorporated. This circuit was designed for a dual-use function as either the receiver module within the base station or the sensor unit microprocessor controller. The function is determined by the way the integrated circuit board is populated. It contains an oscillator for a 4 megahertz processor speed and another 32.768 kilohertz oscillator for a precision clock. It has a human interface switch and a light emitting diode indicator for performing setup processes and checking battery life. An embedded magnetic reed switch is utilized to reduce or eliminate any arcing from switch contact closure. The circuit also has a reboot switch when used as a receiver module.

The TMP36GS temperature component is positioned near the microprocessor for safeguard against operation outside the processor's temperature limitations. It reads the operation temperature within one degree Celsius. It is also positioned directly beneath the battery packs to avoid heating the battery packs beyond the hydrogen explosive limits. The battery packs are not utilized in the receiver module configuration, but the operation temperatures are still monitored for the processor. This internal temperature monitoring component is put into shut-down mode when the sensor unit is in sleep mode to help conserve battery life.

The Linx HP3 transmitter model TXM-900-HP3-PPS is employed in this circuit when configured as the sensor unit. The Linx HP3 receiver model REX-900-HP3-PPS4 is employed when configured as the receiver module. These provide low-power 902-928 MHz band digital transmissions which meet Federal Communication Commissions requirements. The transmission power is set to limit transmissions to a 35-foot radius for preserving data security. Each receiver/transmitter pair is set to a unique address. The addressing scheme implemented provides eight unique addresses. This restricts each monitoring system to eight sensor units. This is ample for monitoring a single valve, but provisions for enabling over two hundred unique addresses are in place for future implementation.

The microprocessor controller circuit also contains several connections for interfacing to the other sensor unit circuitry. In addition to this, an on-board programming and serial communication interface port header and a communication bus interface header are enclosed within this circuit. The base station's bus allows a varying number of receiver units to be connected. Each receiver unit has a unique address and is matched up with a remote sensor unit.

The Monitoring System Sensor Units

The microprocessor, regulator, transmitter, and internal temperature circuitry are common to all the sensor units. The piezoelectric wake-up circuitry may only appear in the strain sensor units. The sensor units are constructed in a manner to minimize modifications for implementing different instrumentation types. However, each instrumentation sensor type requires a unique instrumentation circuit. This is accomplished by using a uniform interface for instrumentation circuit boards of all desired types. The only modifications required in the other sensor circuitry are setting the transmitter address, routing of the secondary regulator, and insertion of the wake-up circuit. This allows for developing new instrumentation monitoring types by developing a new instrumentation circuit board and eliminating redevelopment of other components.

The sensor unit's wake-up circuitry uses a laminated piezoelectric sheet for highly sensitive vibration detection. The sensitivity is adjustable prior to potting the sensor unit. An LDT series vibration detector, commercially available from The Measurement Specialties Inc., is used to detect any valve movements. The piezoelectric laminate produces a voltage capable of waking the microprocessor from sleep mode without any power required from the sensor unit's batteries. This allows the sensor unit to remain in sleep mode with small power consumption and continuously monitor a valve for any events which would require its other instrumentation. This may help extend the sensor units battery life.

The sensor unit's power regulator circuitry takes advantage of the features provided by the dual input smart battery backup regulator, commercially available from Linear Technology. Two of the devices are used to deliver power from four batteries. Both regulators can supply power to the entire sensor unit for extended battery operation durations while maintaining a seamless transfer of supplied power from each battery. When necessary, one can be routed to instrumentation providing excellent isolation for precision instrumentation and noise reduction. The regulator has a power down feature to reduce the power consumption when it is not needed. The regulator also is capable of monitoring the state of the batteries. This allows the microprocessor to appropriately manage power utilization. During the update phase of the microprocessor, the battery levels are tested. If a low state is encountered a data event is transmitted to the base stations indicating required maintenance.

The temperature sensor unit utilizes a cold junction referenced thermocouple instrumentation circuit. The circuit uses a monolithic thermocouple amplifier chip with cold junction compensation pre-trimmed for K Type thermocouples, commercially available from Analog Devices. The temperature sensor unit reads in two K Type thermocouples. The microprocessor reads in an analog signal from the thermocouple and converts it to degrees Fahrenheit. A table lookup algorithm is implemented to obtain an accuracy of plus or minus one degree Fahrenheit. The Omega Engineering, Inc.'s, K Type thermocouple conversion tables are utilized in the table lookup algorithm. The unit is capable of reading temperatures from −454 Fahrenheit to +315 Fahrenheit. The unit can also be point calibrated to a specific thermocouple through the on-board programmer interface header. The unit is pre-programmed to read a temperature every 16 seconds, and can be adjusted as desired. Once the conversion is completed, a data event is transmitted to the base station containing the temperature and time stamp.

The strain instrumentation circuit is use to monitor axial, biaxial and torsional strain types. Each strain instrumentation sensor unit can read two strain types. The placement of precision resistors in the circuit denotes the circuit as a full, half, or quarter bridge foil strain gage configuration. The quarter bridge configuration monitors the single axial bonnet strain for the linear actuated valve. The CEA-09-125UN-350 foil strain gage, commercially available from Vishay, is used in a quarter bridge configuration. The half bridge configuration monitors the same single axial bonnet strain but offers temperature compensation. The SK-09-060WT-350 foil strain gage, commercially available from Vishay, is used in a half bridge configuration. This configuration may be superior when only a single axial strain can be produced but, if any biaxial strains are expected, the quarter bridge configuration may be used. A four micro strain resolution is obtainable from the quarter and half bridge configurations. The full bridge configuration monitors the torsional strain in the high-geared ball valve. The CEA-09-250US-350 foil strain gage, commercially available from Vishay, is used in a full bridge configuration. A four micro strain resolution is obtainable from the full bridge configurations. The typical ball valve requiring health monitoring uses a 2 inch solid 304 stainless rod. A 50 ft/lb torsional force on such a steel rod may be accurately detectable.

A simple magnetic reed limit switch instrumentation circuit is used for tracking the number of valve cycles performed on a high-geared ball valve. The limit switch instrumentation circuit can monitor six switches with the ability to wake the sensor unit up on two switches. The determination of valve cycles performed under cryogenic temperatures is accomplished by the base station correlating a valve cycle event with the inlet and outlet temperature. The base station keeps up with totals and generates the proper data log entry.

The signal circuit is designed to unobtrusively interface into the Linear Voltage Differential Transformer (LVDT) signal from the valve's internal servo controller. It enables the sensor unit to read a 4-20 milliamp signal or a 0-10 volt DC signal for reading the valve position signal. A highly sensitive magnetic sensor reads the milliamp signal by monitoring the magnetic fields produced from the current loop. The sensors used are Giant Magnetoresistance AA series analog sensors, commercially available from Nonvolatile Electronics incorporated. The voltage signal reads the level by use of a voltage follower circuit. Utilizing these methods helps ensure that failures in the monitoring unit may not affect the operation of the valve. The LVDT signal provides a highly accurate valve position within 0.01% of the valve stroke. Monitoring the position changes denotes the total distance of valve travel and the number of directional changes. The monitoring system logs the accumulated distance traveled and total number of directional changes after each position's resultant travel. The fully closed valve position applies a predefined amount of load against the valve seat. This is referred to as the valve preload. As the valve seat incurs wear the valve close position slightly changes, reducing the preload. The valve position is monitored for any change in the close position and generates a data event when necessary.

Additional Attributes

The valve monitoring system may be able to meet other critical criteria to be applicable to field operation. The sensor units may be very power conservative to make them maintainable. The battery packs may last for several weeks, unlike data logging systems on the market, which typically last only a few days. The sensor units are believed to last 4 to 5 weeks. The largest power consuming portion is the wireless transmission device. It may be powered down for the majority of operation time. This means a receiver on the sensor unit is not an option. A one-way communication protocol may be implemented. This makes time synchronization difficult to achieve. The sensor unit and base station receiver unit both have accurate oscillators which can keep time within a quarter of a millisecond for over 5 weeks.

The sensor unit transmits its time once a day to the base station. It only needs to perform one transmission in order to maintain accurate time synchronization. The base station keeps the previous day's time synchronization if a transmission error occurs or no transmission is made. If such an event occurs, an entry into the data log is made in order to identify any data corruption due to time stamping. The monitoring system has 35 days to perform a good data synchronization link-up before any time accuracy is at risk. The base station has an IRIG-B timing module which provides a digital signal to all the base station receiver units. These units synchronize the sensor unit's time to the IRIG time. When a data event occurs, the sensor unit transmits the event and its time according to an internal clock. Redundant transmissions are performed to avoid data transmission errors. The base station receiver unit converts the sensor time to IRIG time. The data event is then passed to the base station's main microprocessor which correlates any other applicable data such as inlet temperature. The refined event log is then stored in a text string on a removable flash memory card and broadcasted on an Ethernet network. The flash memory access units are made with a Compact Flash Development Kit, commercially available from ARMA Design Inc. The microprocessor aboard the Compact Flash board is used as the base station's main controller. The data broadcasting is performed by an off-the-shelf Ethernet embedded controller unit called an I-7188E Module, commercially available from ICS DataCom. The implementation of other network communication transmissions can be accomplished by using the desired communication module.

The description of the invention and its applications as set forth herein is illustrative and is not intended to limit the scope of the invention. Variations and modifications of the embodiments disclosed herein are possible, and practical alternatives to and equivalents of the various elements of the embodiments would be understood to those of ordinary skill in the art upon study of this patent document. These and other variations and modifications of the embodiments disclosed herein may be made without departing from the scope and spirit of the invention.

We claim:

1. A monitoring system, comprising:
a base station;
a first sensor separated from the base station and in wireless, one-way communication with the base station, and comprising a microprocessor, a transmitter, and a battery; and
a first vibration-sensitive switch configured to consume no stored power from the battery and to generate a trigger, the trigger being defined as a voltage created by the first vibration-sensitive switch;
wherein the first sensor remains in a dormant state until the first vibration-sensitive switch generates the trigger, the dormant state being defined as the microprocessor drawing no stored power from the battery; and
wherein upon the microprocessor being directly powered by the trigger of the first vibration-sensitive switch, the transmitter of the first sensor transmits a first measured quantity and a first time stamp to the base station.

2. The monitoring system of claim 1, wherein the first vibration-sensitive switch is a piezoelectronic laminate.

3. The monitoring system of claim 1, wherein the base station records the first measured quantity and the first time stamp, and wherein the first time stamp corresponds to the time at which the first measured quantity is measured.

4. The monitoring system of claim 1, wherein after transmitting the first measured quantity and the first time stamp to the base station, the first sensor returns to the dormant state.

5. The monitoring system of claim 1, wherein the first vibration-sensitive switch is separate from the first sensor.

6. The monitoring system of claim 1, wherein the first vibration-sensitive switch is integral with the first sensor.

7. The monitoring system of claim 1, wherein the first sensor transmits along a line of sight within a radius of 250 feet.

8. The monitoring system of claim 1, wherein the first sensor transmits along a line of sight within a radius of 35 feet.

9. The monitoring system of claim 1, wherein the time stamp is encoded with an IRIG-B timing module.

10. The monitoring system of claim 1, wherein the first sensor fits within a clearance of 2 by 3 by 2 inches.

11. The monitoring system of claim 1, wherein the first measured quantity is a current signal.

12. The monitoring system of claim 1, wherein the first measured quantity is a voltage signal.

13. The monitoring system of claim 1, wherein the first measured quantity is a discrete digital signal.

14. The monitoring system of claim 1, wherein the first measured quantity is a single-axis magnetic field.

15. The monitoring system of claim 1, wherein the first measured quantity is a three-axis magnetic field.

16. The monitoring system of claim 1, wherein the first sensor includes a regulator.

17. The monitoring system of claim 1, further comprising:
a second sensor separated from the base station and in wireless, one-way communication with the base station, and comprising a second microprocessor, a second transmitter, and a second battery; and
a second vibration-sensitive switch configured to consume no stored power from the second battery and to generate a second trigger, the second trigger being defined as a voltage created by the second vibration-sensitive switch;
wherein the second sensor remains in a second dormant state until the second vibration-sensitive switch generates the second trigger, the second dormant state being defined as the second microprocessor and the second transmitter drawing no stored power from the second battery; and
wherein upon the microprocessor being directly powered by the triggered of the second vibration-sensitive switch, the transmitter of the second sensor draws stored power from the battery and transmits a second measured quantity and a second time stamp to the base station.

18. The monitoring system of claim 17, wherein the base station includes a first microprocessor and a first receiver for the first sensor, and a second microprocessor and a second receiver for the second sensor.

19. The monitoring system of claim 1, wherein the first sensor further includes an energy harvester.

20. A monitoring system, comprising:
a base station;
a sensor separated from the base station and in wireless, one-way communication with the base station, and comprising a microprocessor; and a piezoelectronic laminate vibration-sensitive switch configured to generate a trigger, the trigger being defined as a voltage created by the piezoelectronic laminate vibration-sensitive switch;

wherein the sensor remains in a dormant state until the piezoelectronic laminate vibration-sensitive switch generates the trigger, the dormant state being defined as the microprocessor drawing no supply current;

wherein upon the microprocessor being directly powered by the trigger of the piezoelectronic laminate vibration-sensitive switch, the sensor transmits a measured quantity and a time stamp to the base station; and wherein the sensor measures at least one of a current signal, a voltage signal, a discrete digital signal, a single-axis magnetic field, and a three-axis magnetic field.

* * * * *